US010742461B2

(12) United States Patent
Rogel et al.

(10) Patent No.: US 10,742,461 B2
(45) Date of Patent: Aug. 11, 2020

(54) CARRIER FREQUENCY ESTIMATION FOR RADIO FREQUENCY FINGERPRINTING

(71) Applicant: LEVL TECHNOLOGIES, INC., Palo Alto, CA (US)

(72) Inventors: Nuriel Rogel, Rehovot (IL); Dmitry Blokh, Rishon Lezion (IL)

(73) Assignee: LEVL TECHNOLOGIES, INC., Palo Alto, CA (US)

( * ) Notice: Subject to any disclaimer, the term of this patent is extended or adjusted under 35 U.S.C. 154(b) by 0 days.

(21) Appl. No.: 16/585,720

(22) Filed: Sep. 27, 2019

(65) Prior Publication Data

US 2020/0112464 A1 Apr. 9, 2020

Related U.S. Application Data

(60) Provisional application No. 62/740,486, filed on Oct. 3, 2018.

(51) Int. Cl.
*H04L 27/14* (2006.01)
*H04W 12/06* (2009.01)
(Continued)

(52) U.S. Cl.
CPC .............. *H04L 27/14* (2013.01); *H04B 1/06* (2013.01); *H04B 17/20* (2015.01); *H04W 12/06* (2013.01);
(Continued)

(58) Field of Classification Search
CPC ............. H04L 27/2657; H04L 27/2662; H04L 27/2659; H04L 27/2656; H04L 27/266; H04W 56/001
(Continued)

(56) References Cited

U.S. PATENT DOCUMENTS

| 5,893,031 A | 4/1999 | Hoogerwerf et al. |
| 9,613,475 B2 | 4/2017 | Zivkovic et al. |

(Continued)

FOREIGN PATENT DOCUMENTS

| CN | 102693411 A | 9/2012 |
| CN | 202906963 U | 4/2013 |

(Continued)

OTHER PUBLICATIONS

Burzigotti, et al. (2010). Advanced receiver design for satellite-based AIS signal detection. pp. 1-8.

(Continued)

*Primary Examiner* — Leila Malek
(74) *Attorney, Agent, or Firm* — The Roy Gross Law Firm, LLC; Roy Gross

(57) ABSTRACT

A system comprising: at least one hardware processor; and a non-transitory computer-readable storage medium having program code embodied therewith, the program code executable by the at least one hardware processor for: receiving, by a radio frequency (RF) receiver, an RF transmission from an RF transmitter, wherein the RF transmission (a) is modulated in accordance with a specified modulation scheme, and (b) comprises a digital data packet; demodulating the RF transmission to produce a time series of bits that form the digital data packet; and processing the time series of bits to estimate at least one of (i) CFO of the RF transmitter, and (ii) modulation index of the RF transmitter.

17 Claims, 4 Drawing Sheets

(51) Int. Cl.
*H04B 17/20* (2015.01)
*H04B 1/06* (2006.01)
H04B 7/06 (2006.01)
H04B 7/08 (2006.01)
H04L 27/26 (2006.01)

(52) U.S. Cl.
CPC ............ *H04B 7/0695* (2013.01); *H04B 7/088* (2013.01); *H04L 27/2657* (2013.01)

(58) Field of Classification Search
USPC .......................................................... 375/334
See application file for complete search history.

(56) References Cited

U.S. PATENT DOCUMENTS

| | | | |
|---|---|---|---|
| 9,893,886 | B2 | 2/2018 | Tercero |
| 2004/0120412 | A1 | 6/2004 | Banerjea |
| 2006/0273888 | A1 | 12/2006 | Yamamoto |
| 2007/0105520 | A1 | 5/2007 | Van Houtum |
| 2007/0264939 | A1 | 11/2007 | Sugar |
| 2009/0154627 | A1 | 6/2009 | Park et al. |
| 2010/0067546 | A1* | 3/2010 | Mishra ................ H04L 43/0835 370/472 |
| 2010/0254475 | A1* | 10/2010 | Kawauchi ........... H04L 27/0014 375/267 |
| 2016/0174072 | A1 | 6/2016 | Allyn |
| 2016/0226892 | A1 | 8/2016 | Sen et al. |
| 2017/0046299 | A1 | 2/2017 | Issac et al. |
| 2017/0328979 | A1* | 11/2017 | Franke .................. G01S 5/0289 |
| 2018/0212635 | A1 | 7/2018 | Wicaksana et al. |
| 2019/0373537 | A1 | 12/2019 | Trainin et al. |

FOREIGN PATENT DOCUMENTS

| | | |
|---|---|---|
| CN | 105678273 A | 6/2016 |
| CN | 106961434 A | 7/2017 |
| EP | 2744162 B1 | 6/2015 |
| IN | 2005DE00388 A | 12/2006 |
| JP | 2010127833 A | 6/2010 |
| WO | 2014015970 A1 | 1/2014 |
| WO | 2017157563 A1 | 9/2017 |

OTHER PUBLICATIONS

Chang, Dah-Chung. (2009). Least Squares/Maximum Likelihood Methods for the Decision-Aided GFSK Receiver. IEEE Signal Processing Letters, vol. 16, No. 6, Jun. 2009, pp. 517-520.
Mikhail B Tadjikov. (2010). Examination of Techniques for Carrier Frequency Estimation of Frequency Hopped Signals in Time Domain. A report submitted in partial satisfaction of the requirements for the degree Master of Science in Electrical Engineering. University of California, pp. 1-41.
Yan et al. (2013). ZIMO: Building cross-technology MIMO to harmonize zigbee smog with WiFi flash without intervention. Proceedings of the Annual International Conference on Mobile Computing and Networking, MOBICOM. pp. 465-476.
Chatterjee, et al. (2018). RF-PUF: Enhancing IoT Security through Authentication of Wireless Nodes using In-situ Machine Learning.
Polak, et al. (2011). Identifying Wireless Users via Transmitter Imperfections. Selected Areas in Communications, IEEE Journal on. 29. pp. 1469-1479.
Hanif Rahbari (2016). Obfuscation of Transmission Fingerprints for Secure Wireless Communications. Electronic Dissertation. Department of Electrical and Computer Engineering. The University of Arizona. pp. 1-171.
Rehman, et al. (2014). Radio frequency fingerprinting and its challenges. 2014 IEEE Conference on Communications and Network Security, CNS 2014, pp. 496-497.
Vo-Huu, et al. (2016). Fingerprinting Wi-Fi devices using software defined radios. In Proceedings of the 9th ACM Conference on Security & Privacy in Wireless and Mobile Networks. ACM, pp. 3-14.
Wang, et al. (2012). Watchdog Sensor Network with Multi-Stage RF Signal Identification and Cooperative Intrusion Detection. https://apps.dtic.mil/dtic/tr/fulltext/u2/a574098.pdf.
Phylaws (Id 317562), FP7-ICT-2011-call8, Security Solutions utilizing Physical Communication Layer, pp. 24-60, 2012.
Ignacio Fernández Hernandez. (Jun. 2015). Thesis. Snapshot and Authentication Techniques for Satellite Navigation.
Psiaki, et al. (2016). GNSS Spoofing and Detection. Proceedings of the IEEE, 104(6), 1258-1270.
International Search Report, International Application No. PCT/IB2019/056108, dated Dec. 12, 2019.
Notice of References Cited, Notice of Allowance U.S. Appl. No. 16/551,914, dated Feb. 25, 2020.
Hou, Weikun, et al. "Physical Layer Authentication in OFDM Systems Based on Hypothesis Testing of CFO Estimates." IEEE International Conference on Communications (ICC), pp. 3559-3563. IEEE, Oct. 2012 Jun. 2012 (Jun. 10, 2012).
Raboh, Mohamed S. Abd, et al. "Carrier Frequency Offset (CFO) Estimation Methods, a Comparative Study." (2015) Aersopace Sciences and Aviation Technology, ASAT. May 26-28, 2015.
Riyaz, Shamnaz Mohammed. "Radio Fingerprinting Using Convolutional Neural Networks." PhD diss., Northeastern University, 2018. Retrieved from the Internet: <URL: https://search.proquest.com/openview/78c8d5cb335b09d89ba51e28412473a6/1?cbl=18750&diss=y&pq-origsite=gscholar> Jul. 31, 2018 (Jul. 31, 2018).
Vo-Huu, Tien Dang, et al. "Fingerprinting Wi-Fi Devices Using Software Defined Radios." Proceedings of the 9th ACM Conference on Security & Privacy in Wireless and Mobile Networks, pp. 3-14. 2016.18 Jul. 2016 (Jul. 18, 2016).
International Search Report, International Application No. PCT/IB2019/057207, dated Nov. 26, 2019.
International Search Report, International Application No. PCT/IB2019/058170, dated Jan. 27, 2020.

* cited by examiner

CARRIER FREQUENCY ESTIMATION FOR RADIO FREQUENCY FINGERPRINTING

CROSS REFERENCE TO RELATED APPLICATIONS

This application is a track one application that claims priority to U.S. Provisional Application No. 62/740,486, filed on Oct. 3, 2018. The content of this application is incorporated by reference as if set forth its entirety.

FIELD OF THE INVENTION

The invention relates generally to the field of wireless communication systems.

BACKGROUND OF THE INVENTION

The use of wireless communication systems and their interconnections via networks have grown rapidly in recent years. Because radio frequency (RF) waves can penetrate obstacles, wireless devices can communicate with no direct line-of-sight between them. This makes RF communication easier to use than wired or infrared communication. For example, billions of Bluetooth devices, such as laptops, smartphones, computer peripherals, headsets, and handsfree devices, are widely used all over the world.

However, wireless RF communication is also easier to hack and disrupt than wired communication. Because wireless RF communication can suffer from these threats, additional countermeasures are needed to protect against them.

The foregoing examples of the related art and limitations related therewith are intended to be illustrative and not exclusive. Other limitations of the related art will become apparent to those of skill in the art upon a reading of the specification and a study of the figures.

SUMMARY OF THE INVENTION

The following embodiments and aspects thereof are described and illustrated in conjunction with systems, tools and methods which are meant to be exemplary and illustrative, not limiting in scope.

There is provided, in accordance with an embodiment, a system comprising: at least one hardware processor; and a non-transitory computer-readable storage medium having program code embodied therewith, the program code executable by said at least one hardware processor for: receiving, by a radio frequency (RF) receiver, an RF transmission from an RF transmitter, wherein the RF transmission (a) is modulated in accordance with a specified modulation scheme, and (b) comprises a digital data packet; demodulating the RF transmission to produce a time series of bits that form the digital data packet; and processing said time series of bits to estimate at least one of (i) CFO of the RF transmitter, and (ii) modulation index of the RF transmitter.

There is also provided, in an embodiment, a method comprising: receiving, by a radio frequency (RF) receiver, an RF transmission from an RF transmitter, wherein the RF transmission (a) is modulated in accordance with a specified modulation scheme, and (b) comprises a digital data packet; demodulating the RF transmission to produce a time series of bits that form the digital data packet; and processing said time series of bits to estimate at least one of (i) CFO of the RF transmitter, and (ii) modulation index of the RF transmitter.

There is further provided, in an embodiment, a computer program product comprising a non-transitory computer-readable storage medium having program instructions embodied therewith, the program instructions executable by at least one hardware processor to: receiving, by a radio frequency (RF) receiver, an RF transmission from an RF transmitter, wherein the RF transmission (a) is modulated in accordance with a specified modulation scheme, and (b) comprises a digital data packet; demodulating the RF transmission to produce a time series of bits that form the digital data packet; and processing said time series of bits to estimate at least one of (i) CFO of the RF transmitter, and (ii) modulation index of the RF transmitter.

In some embodiments, said processing comprises modulating a theoretical RF transmission from said time series of bits, wherein said modulating is in accordance with the specified modulation scheme; and said estimating is based, at least in part, on comparing the RF transmission and the theoretical RF transmission.

In some embodiments, said modulating is based on one of a frequency-shift keying (FSK) modulation and a Gaussian frequency-shift keying (GFSK) protocol.

In some embodiments, said estimating further comprises solving a set of linear equations using a least squares method.

In some embodiments, said comparing further comprises calculating a derivative of said set of linear equations based on subtracting equation pairs.

In some embodiments, said processing comprises identifying, in said time series of bits, a plurality of bit sequences having a specified minimum number of identical bits; said estimating of said CFO of said RF transmitter is based, at least in part, on calculating a weighted average of CFO values of all said bit sequences; and said estimating of said modulation index of said RF transmitter is based, at least in part, on calculating a weighted average of modulation index values of all said bit sequences.

In some embodiments, said weighting is based, at least in part, on a length of each of said bit sequences.

In some embodiments, the method further comprises determining, and the program instructions are further executable to determine, whether a runtime RF transmission originates from said RF transmitter, by comparing at least one of (i) a CFO of the runtime RF transmission with said estimated CFO of said RF transmitter, and (ii) a modulation index of the runtime RF transmission with said estimated modulation index of said RF transmitter.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION OF THE INVENTION

Figure 1:
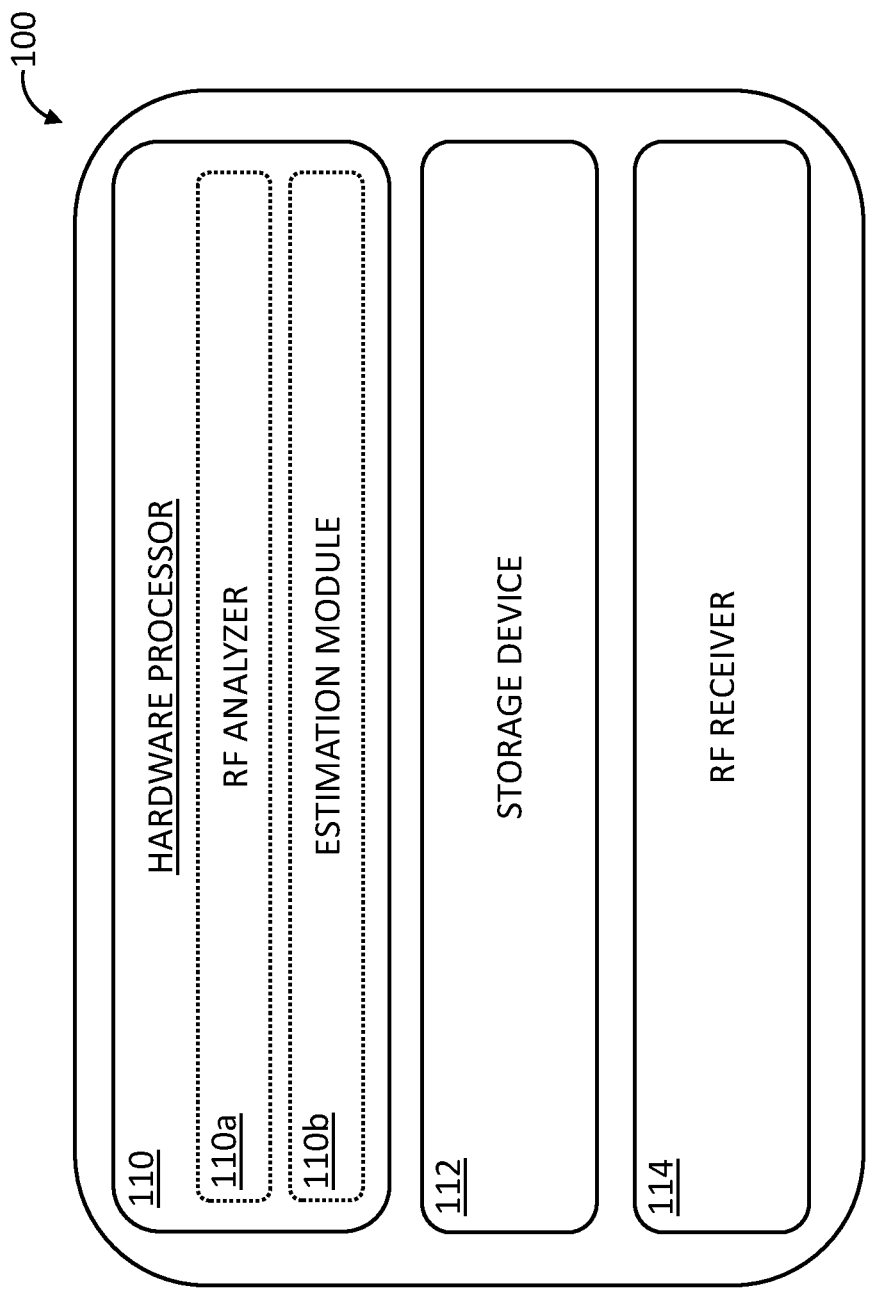
FIG. 1 is a block diagram of an exemplary system for identification and authentication of a radio frequency (RF) device based on Carrier Frequency Offset (CFO) and/or modulation index, according to an embodiment.

Disclosed herein are a system, method, and computer program product for quick and reliable estimation of Carrier Frequency Offset (CFO) and/or modulation index values in radio frequency (RF) devices.

The term "RF" is used herein broadly, to include all signals transmitted as free-space electromagnetic radiation or emission in all frequency bands used in communications and according to a wide variety of RF communication protocols. In some embodiments, the present invention may be applied with respect to one or more local area networks and/or personal area network protocols, including, but not limited to, Bluetooth, Bluetooth Low Energy (BLE), Zig-Bee, and/or Wi-Fi.

"RF fingerprint" refers to idiosyncratic hardware-related traits, characteristics, and/or features of an individual RF device. These small differences are device-specific, even among devices of the same model, and manifest themselves as artifacts of emitted signals. They may be attributed to, e.g., component manufacturing tolerances, device age, etc. In some cases, these traits, characteristics, and/or features may be sufficiently unique, either individually or in combination, so as to form a radiometric identity of the transmitting device. Because RF fingerprints are difficult to clone, they may be exploited to obtain reliable and efficient electronic fingerprints and signatures from RF devices. These, in turn, may play a significant role in improving the security of many RF transmission protocols, e.g., for identification and authentication purposes. For example, by obtaining and storing the unique fingerprints of RF devices in a network, each device can be positively identified and authenticated within the network, thereby thwarting attempts to infiltrate the network with an unauthorized device attempting to impersonate an authorized device. In another example, RF fingerprints may also help to avoid relay attacks, because a relay device attempting to impersonate a legitimate device will, by necessity, have a slightly different RF fingerprint which may be detected by the receiving device.

CFO and modulation index are a common anomaly in transmitting devices, which often occurs when a local oscillator signal in the receiver does not synchronize with the carrier signal contained in the received signal. As a result, the received signal may be shifted in frequency. This phenomenon can be attributed to several factors, chief of which is clock drift in the transmitting device. Clock drift is a phenomenon caused by manufacturing variability of oscillators. To keep manufacturing costs low, typically a range of 7.5-100 ppm is assumed for commonplace wireless devices, such as consumer Bluetooth devices. This means that, for RF transmission in the 2.4 GHz band, CFO may be in the range of 18 kHz to 240 kHz.

Because CFO and modulation index are a device-specific trait, it may be leveraged for use in device fingerprinting authentication. Specifically, the frequency mismatch in the transmitter and the receiver oscillators can be measured and used in constructing a device RF fingerprint.

Accordingly, in some embodiments, the present invention provides for one or more algorithms configured for calculating an estimated CFO value and/or modulation index for an RF device, based on at least one digital data packet received from the device. The estimated CFO value and/or modulation index calculated for the RF device may then be used, alone or with other elements, in constructing a more accurate RF fingerprint for identification and authentication of the device.

In some embodiments, the algorithm of the present invention may be based, at least in part, on receiving at least one digital data packet, demodulating the packet to obtain a time series of bits that form the digital data packet, and then re-modulating the packet using known relevant transmission protocol parameters. The re-modulated packet may then be used to estimate CFO and a modulation index for the transmitting device.

In some embodiments, a system of the present invention may use the CFO and/or modulation index estimations of one or more RF devices, to generate and store, in a dedicated database of profiles, CFO and/or modulation index profiles of the one or more RF devices. In some embodiments, a system of the present invention may be configured for using such CFO and/or modulation index profiles as part of fingerprinting authentication of an RF device. In some embodiments, the fingerprinting authentication may be based on the predicted CFO and/or modulation index values alone, or in combination with one or more other RF fingerprinting parameters.

A potential advantage of the present invention is, therefore, in that it may provide for a quick, reliable, and efficient identification and authentication of an RF device, based upon estimating an accurate CFO and/or modulation index values for the device from as little as a single digital data packet received from the device. The disclosed invention is easy to use and cost effective, does not require any additional hardware, and has no significant negative effect on the size, power consumption, and/or price of the RF device being authenticated.

Accordingly, a system of the present invention may be used, e.g., in the context of a wireless communications network, for identifying and authenticating authorized network devices. For example, when a new device first joins the network, one or more existing network devices may perform a learning stage for constructing a CFO and/or modulation index profile for the new device. The CFO profile may then be stored, together with all other existing network profiles, in a network-wide database of authorized CFO and/or modulation index profiles. Thereafter, whenever the device attempts to connect to the network, the stored CFO and/or modulation index profile of the device will be matched against runtime CFO and/or modulation index values acquired from the device, to permit or deny network service or login to the device.

FIG. 1 is a block diagram of an exemplary system 100 for identification and authentication of an RF device based, at least in part, on a calculated expected CFO and/or modulation index value for the device. System 100 as described herein is only an exemplary embodiment of the present invention, and in practice may have more or fewer components than shown, may combine two or more of the components, or a may have a different configuration or arrangement of the components. The various components of system 100 may be implemented in hardware, software or a combination of both hardware and software. In various embodiments, system 100 may comprise one or more dedicated hardware devices, or may form an addition to or extension of an existing device.

In some embodiments, system 100 may comprise a hardware processor 110, which may include an RF analyzer 110a and a estimation module 110b; a non-transitory computer-readable memory storage device 112; and an RF receiver 114 configured for handling both transmitted and received RF signals. System 100 may store in storage device 112 software instructions or components configured to operate a processing unit (also "hardware processor," "CPU," or simply "processor"), such as hardware processor 110. In some embodiments, the software components may include an operating system, including various software components and/or drivers for controlling and managing general system tasks (e.g., memory management, storage device control, power management, etc.), and facilitating communication between various hardware and software components. In addition, system 100 may include such other components as one or more antenna elements, digital-to-analog (DAC) converters, amplification modules, and the like. In other embodiments, system 100 may also contain one or more accelerometers, a Global Positioning System (GPS) receiver and related circuitry, and data transmission circuitry, such as a Wi-Fi transceiver.

In some embodiments, system 100 may be any network device or node used to authenticate one or more devices as they communicate. For instance, system 100 can be a wireless access point or a cellular base station. The communication network or networks can include any wireless communication network such as a mobile data network, a cellular voice and data network, a wireless local area network (e.g., WiFi or an 802.xx network), a satellite communications network, a personal area network, or any other wireless network. The communication devices can include any network edge device, bridge device or home gateway, a mobile communication device, laptop computer, tablet, smartphone, smart watch, or any other communication device.

In some embodiments, as noted above, system 100 may be implemented as software instructions embedded and being executed on one or more devices within a network, wherein each system 100 device may comprise any network device or node. In such cases, the computational tasks of constructing CFO and/or modulation index profiles for network devices may be shared by one or more of the system 100 devices, so as to divide overall computational load.

Figure 2A:
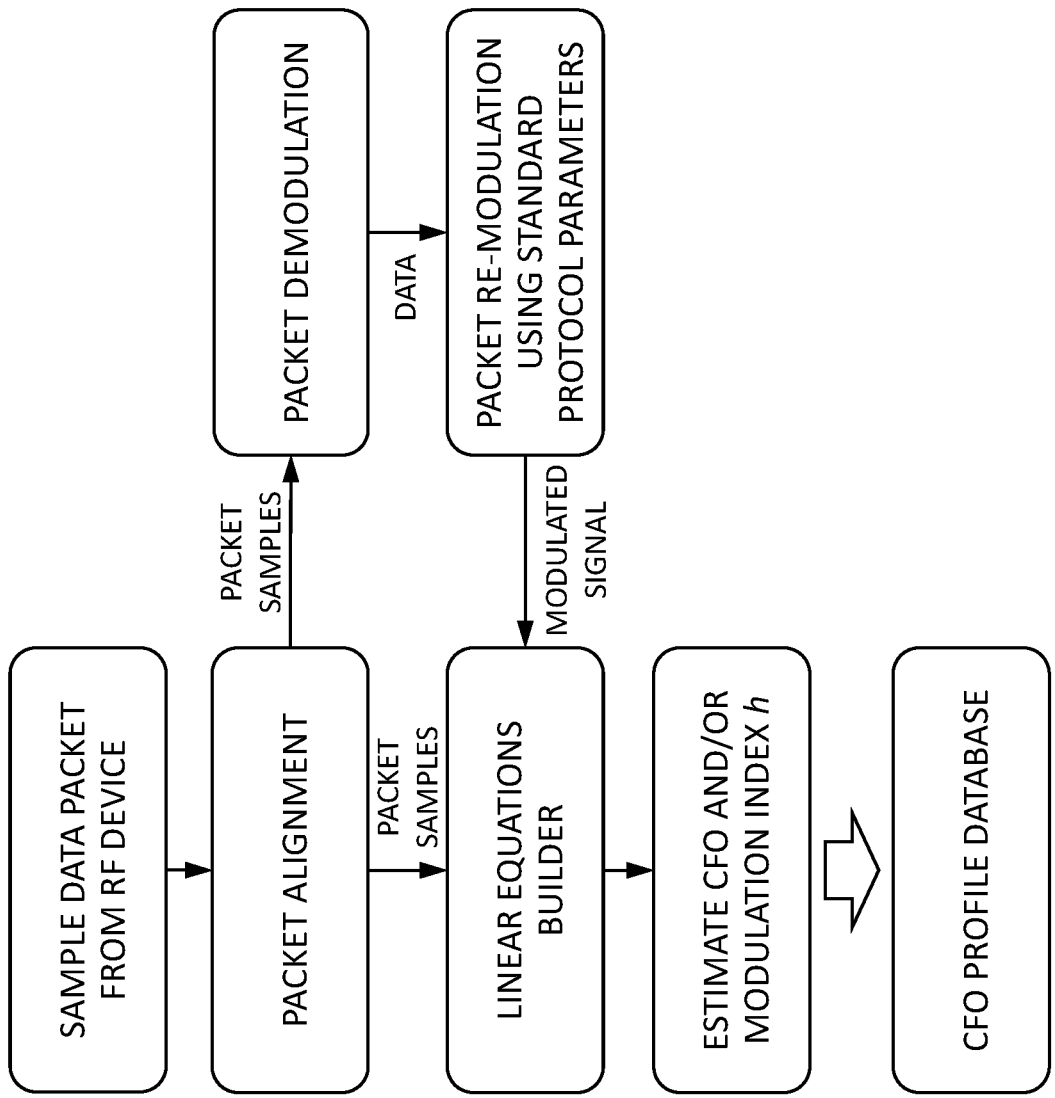
FIG. 2A is a flowchart of a process for estimating a CFO and/or modulation index for an RF device, according to an embodiment.

Overview of the functional steps in one or more processes for estimating a CFO value for an RF device, using a system such as system 100 in FIG. 1, will now be provided with reference to the block diagram in FIG. 2A. The following discussion will focus on applications of the present invention with respect to transmission protocols where data modulation is achieved by employing Gaussian frequency-shift keying (GFSK). However, as noted above, the present invention may be applied with respect to one or more local area networks and/or personal area network protocols, using other frequency-shift keying (FSK) and/or additional modulation techniques.

Figure 3:
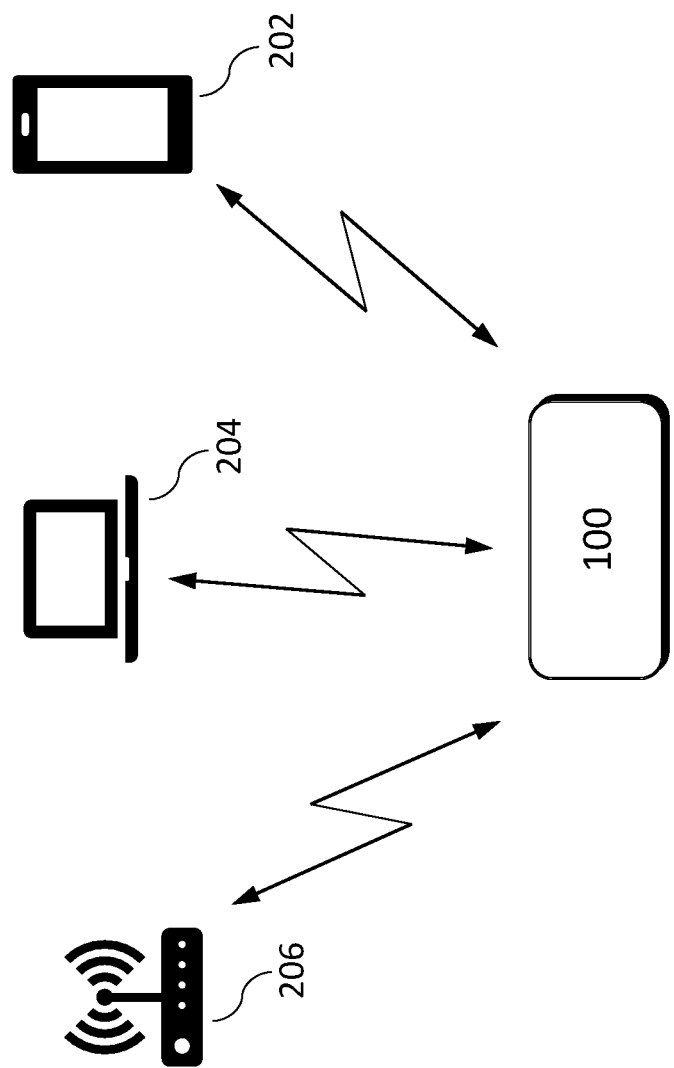
FIG. 3 schematically illustrate data acquisition for generating a CFO and/or modulation index profile of a radio frequency (RF) device, according to an embodiment.

In some embodiments, as schematically illustrated in FIG. 3, at a learning stage, system 100 may be configured for receiving at least one digital data packet corresponding to an RF device, for example, smartphone 202, laptop computer 204, and/or router 206.

In some embodiments, RF analyzer 110a may be configured for processing and analyzing a variety of parameters and features with respect to the one or more digital data packets received by RF receiver 114. Such parameters and features may include, but are not limited to, CFO parameters, phase parameters, frequency parameters, and/or amplitude parameters.

In some embodiments, RF analyzer 110a is configured for performing packet alignment with respect to a received digital data packet, so as to be able to determine the starting point of each data bit in the packet. In some embodiments, packet bit alignment may be performed by sampling the signal at an appropriate oversampling rate, to identify local phase maximums:

$$M = \{l_1, \ldots, l_k : \theta_{l_i} \geq \theta_{l_{i-1}} \wedge \theta_{l_{i-1}} > \theta_{l_{i-2}} \wedge \theta_{l_{i+1}} > \theta_{l_{i+2}}\},$$

where the packet local phases are denoted $\theta_1, \ldots, \theta_T$.

The packet may be considered to be correctly aligned once the function $$\{l_i \% \text{ oversample rate} : l_i \in M\}$$

results in a string of zeros (however, small exceptions may occur due to noisy samples). The alignment process may be concluded by removing k samples from the beginning of the packet, where $$k = \text{median}(\{l_i \% \text{ oversample rate} : l_i \in M\}).$$

In some embodiments, once the digital data packet is properly aligned, estimation module 110b may be configured for demodulating the data bits to derive the underlying data, by examining the phase of the modulation samples $\theta_{i*k+1}, \ldots, \theta_{i*(k+1)}$ corresponding to each data bit $X_1, \ldots, X_n$ (n=T/oversample rate), where k is the number of samples obtained per bit. In some embodiments, each data bit may be demodulated by determining the sign (i.e., positive or negative) of the derivative of the phase of the bit, where a positive phase corresponds to a logical '1' and a negative phase corresponds to a logical '0'. Accordingly, the bit may be expressed as:

$$X_i = (\text{sign}(\theta_{i*(k+1)-k/4} - \theta_{i*k+1+k/4}) + 1)/2.$$

Estimation Algorithm

With continued reference to FIG. 2A, in some embodiments, once the packet has been demodulated and the underlying data bits derived, estimation module 110b may be configured for re-modulating the data to create a theoretical perfect GFSK waveform, by using GFSK modulation with the known parameters defined in the relevant transmission protocol (e.g., BLE). The modulated data $G_1, \ldots, G_T$ may then be used to get a set of linear equations derived from each phase sample:

$$\theta_i = \frac{2\pi i}{\text{sampling frequency}} * CFO + G_i * h + \theta_1 + \varepsilon_i,$$

where h is an unknown modulation index, CFO is the unknown carrier frequency offset, and $\varepsilon_i$ is the noise for sample i. Both CFO and h may then be estimated by solving the linear equations using a least squares method.

CFO Estimation Algorithm—Embedded Version

In some embodiments, the present invention provides for an embedded version of system 100, e.g., as software instructions embedded and executed on one or more devices, such as a mobile device. In some embodiments, an embedded system 100 may be configured for reducing computational time of the estimation algorithm. In some embodiments, an embedded version of system 100 may be configured to carry out the steps of packet alignment, packet demodulating and decoding, and data re-modulation, as described above with reference to FIG. 2A under "Estimation Algorithm." However, in some embodiments, in order to optimize running time, the linear equations builder step may provide for subtracting equation pairs. Accordingly, in some embodiments, the linear equations may be expressed as:

$$\theta_{i+j} - \theta_i = \frac{2\pi j}{\text{sampling frequency}} * CFO + (G_{i+j} - G_i) * h + \varepsilon_{i+j} - \varepsilon_i$$

This way, there may be obtained a set of equations with only one explanatory variable h (modulation index), and an intercept which may be solved more efficiently than the original equations. The new linear equations may be denoted $$\theta_i^* = \alpha + G_i^* * h + \varepsilon_i^*,$$

where:

$$\theta_i^* = \theta_{i+j}^* - \theta_i^*,$$

$$\alpha = \frac{2\pi j}{\text{sampling frequency}} * CFO,$$

$$G_i^* = G_{i+j} - G_i, \text{ and}$$

$$\varepsilon_i^* = \varepsilon_{i+j} - \varepsilon_i.$$

Based on the above, there can be obtained:

$$h = \frac{\text{Cov}(G^*, \theta^*)}{\text{Var}(G^*)},$$

and $$\alpha = \text{mean}(\theta^*) - \frac{\text{Cov}(G^*, \theta^*)}{\text{Var}(G^*)} * \text{mean}(G^*),$$

from which there can be derived the CFO value:

$$CFO = \alpha * \frac{\text{sampling frequency}}{2\pi j}.$$

In this example, j was selected as 4*oversample rate. Note that by choosing a larger j, the total number of equations may decrease, while a smaller j may lead to correlations between the noise in different equations.

Estimation Algorithm—Constant Data Version

Figure 2B:
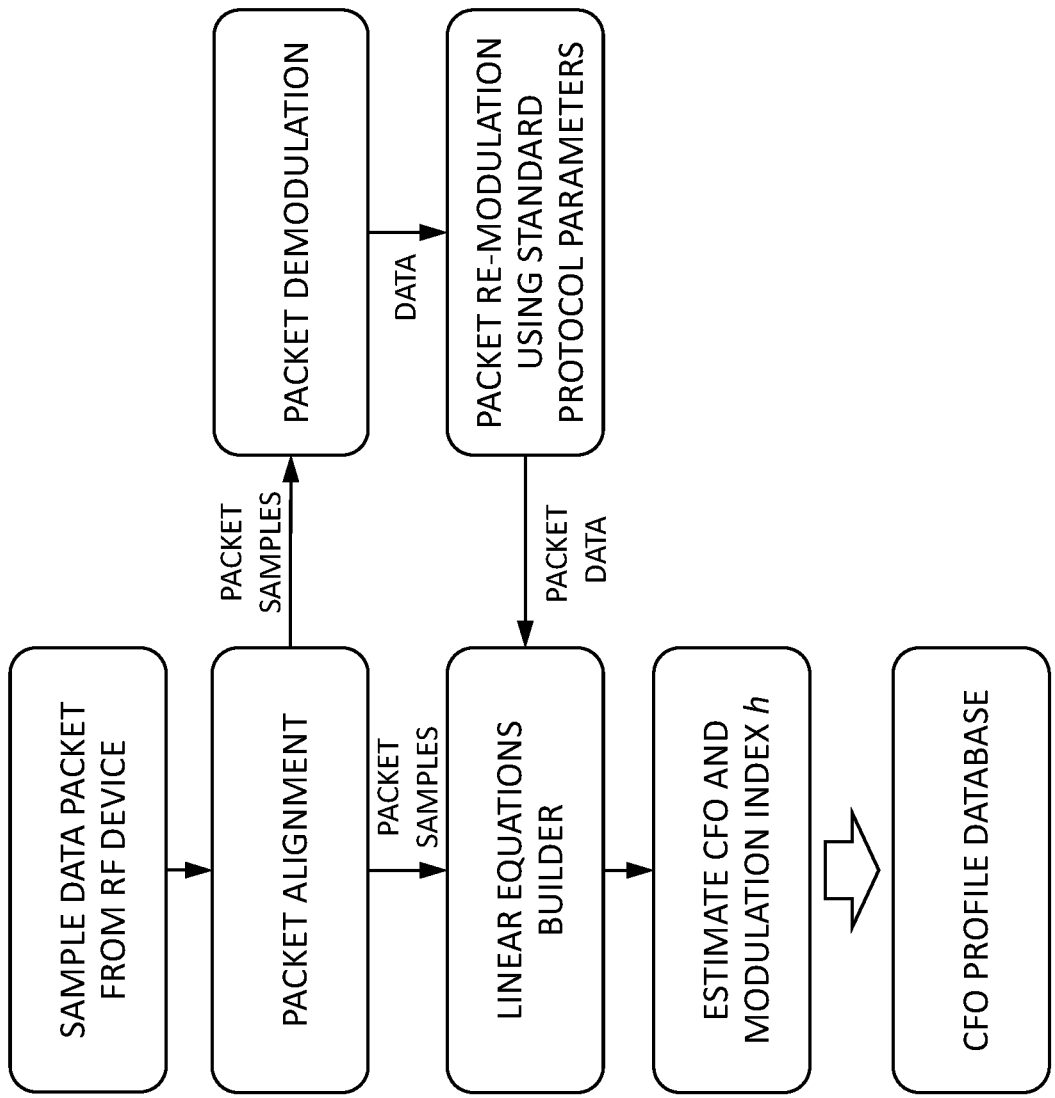
FIG. 2B is a flowchart of a process for constant data estimating of a CFO and/or modulation index for an RF device, according to an embodiment.

With reference to FIG. 2B, in some embodiments, a constant data variation of the estimation algorithm described above under "Estimation Algorithm" may be employed. In the disclosed constant data variation, estimation module 110b may be configured for calculating separately the CFO value for '1' and '0' bits in the received digital data packet. In this variation, the packet alignment and packet decoding stages are performed as described above under "Estimation Algorithm." Then, estimation module 110b may be configured for obtaining data segments having each a minimum-length sequence of identical decoded data bits (i.e., 0 or 1, respectively). These segments may be acquired as follows:

$$X_1 = \{(x_i, x_{i+1}, \ldots, x_{i+l}): x_i = x_{i+1} = \ldots = x_{i+l} = 1 \wedge l > 4\}$$

$$X_0 = \{(x_i, x_{i+1}, \ldots, x_{i+l}): x_i = x_{i+1} = \ldots = x_{i+l} = 0 \wedge l > 4\}$$

where l is the minimum length for consecutive identical bits.

For every acquired segment $(x_i, x_{i+1}, \ldots, x_{i+l})$, the corresponding phase samples $(\theta_{i*k+1}, \ldots, \theta_{(i+l+1)*k})$ may be considered, where k is the oversample rate. In some embodiments, two samples are removed from the edges of each phase segment, in order to cancel the modulation gaussian filter effect, to get the segments:

$$G_1 = \{(\theta_{i*k+3}, \theta_{i*k+4}, \ldots, \theta_{(i+l+1)*k-2}): x_i = x_{i+1} = \ldots = x_{i+1} = 1 \wedge l > 4\}$$

$$G_1 = \{(\theta_{i*k+3}, \theta_{i*k+4}, \ldots, \theta_{(i+l+1)*k-2}): x_i = x_{i+1} = \ldots = x_{i+1} = 1 \wedge l > 4\}.$$

Then, for every segment in $G_1$, $G_0$ there is assumed a constant CFO value, which may be found by solving the equations set:

$$\{\theta_{s+j} = j*CFO + \theta_s: 1 \le j \le m\},$$

where $\theta_s$ is the first segment phase sample and m is the segment length. In some embodiments, these equations may be solved by using the linear equations solving method described above under "Estimation Algorithm—Embedded Version."

Given the calculated CFO for all segments, the RF device CFO values corresponding, respectively, to 1 data bits and to 0 data bits, may then be calculated in the following way:

$$F_1 = \frac{\sum_{i=1}^{t} f_i * m_i}{\sum_{i=1}^{t} m_i},$$

$$F_0 = \frac{\sum_{i=1}^{r} g_i * l_i}{\sum_{i=1}^{r} l_i},$$

where:
t is the number of segments in $G_1$;
r is the number of segments in $G_0$;
$f_1, \ldots, f_t$ are the frequencies corresponding to the segments in $f_1$;
$g_1, \ldots, g_r$ are the frequencies corresponding to the segments in $G_0$;
$m_1, \ldots, m_t$ are the length of the segments in $G_1$; and
$l_1, \ldots, l_r$ are the lengths of the segments in $G_0$.

The RF device total CFO may then be derived as the average of $F_0$ and $F_1$.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a hardware processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the description and claims of the application, each of the words "comprise" "include" and "have", and forms thereof, are not necessarily limited to members in a list with which the words may be associated. In addition, where there are inconsistencies between this application and any document incorporated by reference, it is hereby intended that the present application controls.

What is claimed is:

1. A system comprising:
   at least one hardware processor; and
   a non-transitory computer-readable storage medium having program code embodied therewith, the program code executable by said at least one hardware processor for:
   receiving, by a radio frequency (RF) receiver, an RF transmission from an RF transmitter, wherein the RF transmission (a) is modulated in accordance with a specified modulation scheme, and (b) comprises a digital data packet;
   demodulating the RF transmission to produce a time series of bits that form the digital data packet;

processing said time series of bits to estimate at least one of (i) Carrier Frequency Offset (CFO) of the RF transmitter, and (ii) modulation index of the RF transmitter; and determining whether a runtime RF transmission originates from said RF transmitter by comparing at least one of (i) a CFO of said runtime RF transmission with said estimated CFO, and (ii) a modulation index of said runtime RF transmission with said estimated modulation index.

2. The system of claim 1, wherein:
(i) said processing comprises modulating a theoretical RF transmission from said time series of bits, wherein said modulating is in accordance with the specified modulation scheme; and
(ii) said estimating is based, at least in part, on comparing the RF transmission and the theoretical RF transmission.

3. The system of claim 2, wherein said modulating is based on one of a frequency-shift keying (FSK) modulation and a Gaussian frequency-shift keying (GFSK) protocol.

4. The system of claim 3, wherein said estimating further comprises solving a set of linear equations using a least squares method.

5. The system of claim 4, further comprising calculating a derivative of said set of linear equations based on subtracting equation pairs.

6. The system of claim 1, wherein:
(i) said processing comprises identifying, in said time series of bits, a plurality of bit sequences having a specified minimum number of identical bits;
(ii) said estimating of said CFO of said RF transmitter is based, at least in part, on calculating a weighted average of CFO values of all said bit sequences; and
(iii) said estimating of said modulation index of said RF transmitter is based, at least in part, on calculating a weighted average of modulation index values of all said bit sequences.

7. A method comprising:
receiving, by a radio frequency (RF) receiver, an RF transmission from an RF transmitter, wherein the RF transmission (a) is modulated in accordance with a specified modulation scheme, and (b) comprises a digital data packet;
demodulating the RF transmission to produce a time series of bits that form the digital data packet;
processing said time series of bits to estimate at least one of (i) Carrier Frequency Offset (CFO) of the RF transmitter, and (ii) modulation index of the RF transmitter, and
determining whether a runtime RF transmission originates from said RF transmitter by comparing at least one of (i) a CFO of said runtime RF transmission with said estimated CFO, and (ii) a modulation index of said runtime RF transmission with said estimated modulation index.

8. The method of claim 7, wherein:
(i) said processing comprises modulating a theoretical RF transmission from said time series of bits, wherein said modulating is in accordance with the specified modulation scheme; and
(ii) said estimating is based, at least in part, on comparing the RF transmission and the theoretical RF transmission.

9. The method of claim 8, wherein said modulating is based on one of a frequency-shift keying (FSK) modulation and a Gaussian frequency-shift keying (GFSK) protocol.

10. The method of claim 9, wherein said estimating further comprises solving a set of linear equations using a least squares method.

11. The method of claim 10, further comprising calculating a derivative of said set of linear equations based on subtracting equation pairs.

12. The method of claim 7, wherein:
(i) said processing comprises identifying, in said time series of bits, a plurality of bit sequences having a specified minimum number of identical bits;
(ii) said estimating of said CFO of said RF transmitter is based, at least in part, on calculating a weighted average of CFO values of all said bit sequences; and
(iii) said estimating of said modulation index of said RF transmitter is based, at least in part, on calculating a weighted average of modulation index values of all said bit sequences.

13. A computer program product comprising a non-transitory computer-readable storage medium having program instructions embodied therewith, the program instructions executable by at least one hardware processor for to:
receiving, by a radio frequency (RF) receiver, an RF transmission from an RF transmitter, wherein the RF transmission (a) is modulated in accordance with a specified modulation scheme, and (b) comprises a digital data packet;
demodulating the RF transmission to produce a time series of bits that form the digital data packet;
processing said time series of bits to estimate at least one of (i) Carrier Frequency Offset (CFO) of the RF transmitter, and (ii) modulation index of the RF transmitter, and
determining whether a runtime RF transmission originates from said RF transmitter by comparing at least one of (i) a CFO of said runtime RF transmission with said estimated CFO, and (ii) a modulation index of said runtime RF transmission with said estimated modulation index.

14. The computer program product of claim 13, wherein:
(i) said processing comprises modulating a theoretical RF transmission from said time series of bits, wherein said modulating is in accordance with the specified modulation scheme; and
(ii) said estimating is based, at least in part, on comparing the RF transmission and the theoretical RF transmission.

15. The computer program product of claim 14, wherein said estimating further comprises solving a set of linear equations using a least squares method.

16. The computer program product of claim 15, further comprising calculating a derivative of said set of linear equations based on subtracting equation pairs.

17. The computer program product of claim 13, wherein:
(i) said processing comprises identifying, in said time series of bits, a plurality of bit sequences having a specified minimum number of identical bits;
(ii) said estimating of said CFO of said RF transmitter is based, at least in part, on calculating a weighted average of CFO values of all said bit sequences; and
(iii) said estimating of said modulation index of said RF transmitter is based, at least in part, on calculating a weighted average of modulation index values of all said bit sequences.

* * * * *